Aug. 16, 1966     J. W. HUGHES     3,266,252
RESONANT PRESSURE GENERATING COMBUSTION MACHINE
Filed March 4, 1964
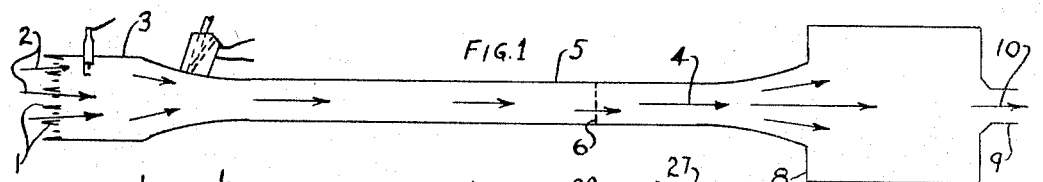
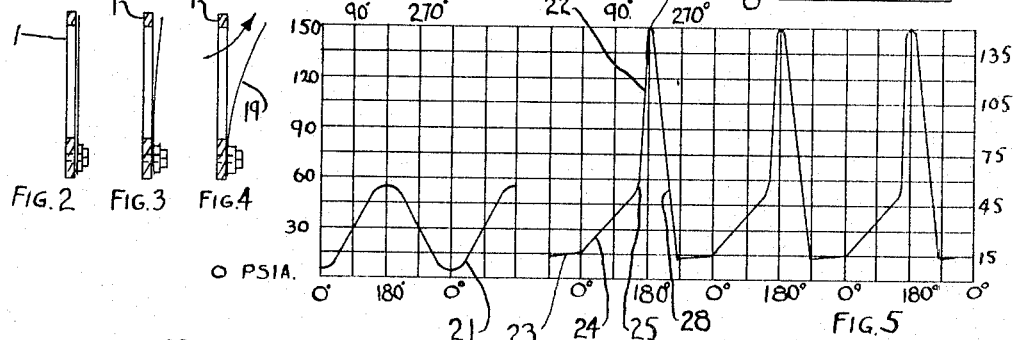
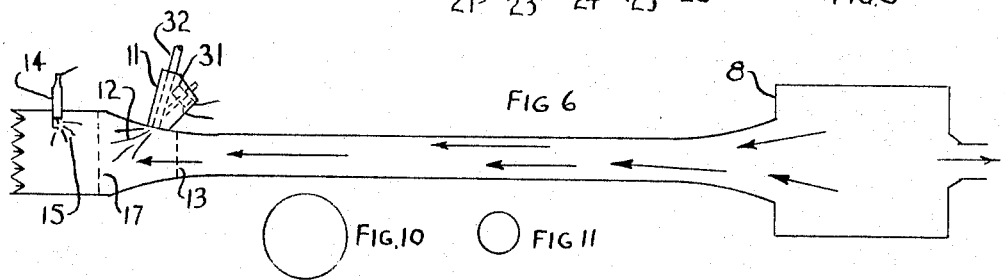
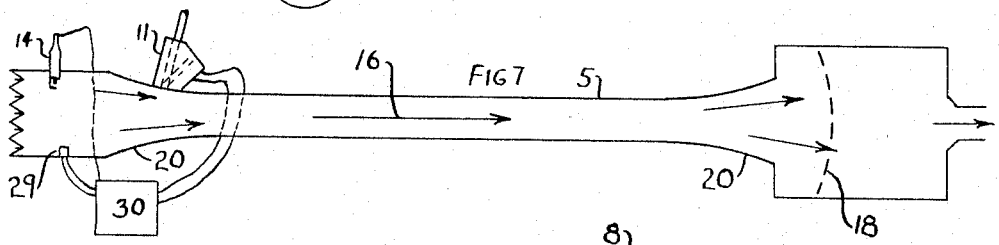
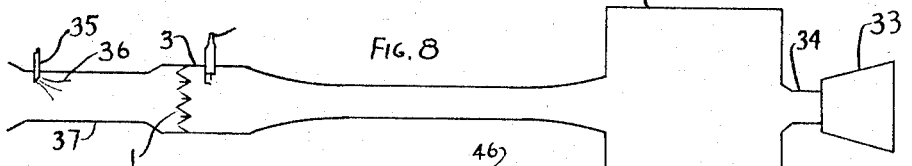
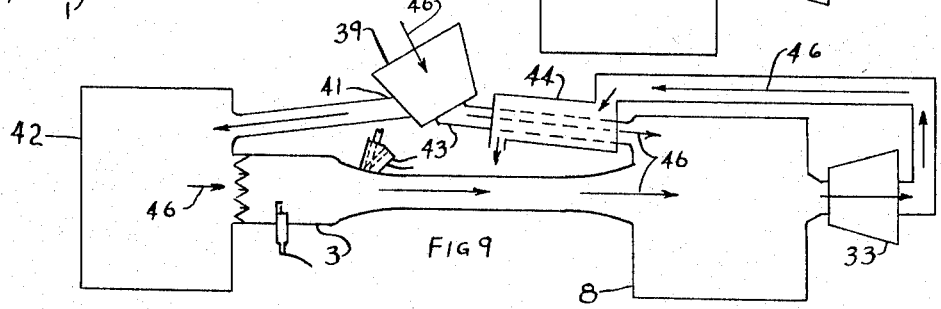
INVENTOR John Wesley Hughes

United States Patent Office 3,266,252
Patented August 16, 1966

3,266,252
RESONANT PRESSURE GENERATING
COMBUSTION MACHINE
John Wesley Hughes, Rte. 1, Box 82, Jamestown, N.C.
Filed Mar. 4, 1964, Ser. No. 349,329
6 Claims. (Cl. 60—39.77)

This invention relates generally to explosion gas turbines.

Explosion gas turbines have long attracted inventors, because this type of gas turbine has the theoretical ability to exceed continuous combustion gas turbines in efficiency; however, when an explosion gas turbine has been designed or built, it is usually discovered that undesirable features have been introduced in order to make the system operate. For instance, sliding exhaust valves have been proposed, but little provision is usually made to accommodate the enormous pressures, terrific heat, and friction they would have to operate under. Also, explosion gas turbines have a tendency to become complicated so that turbulence loss is increased, and increased cost is a serious drawback. In addition, the compressor and turbine have to operate under intermittent conditions in many designs; this is also a serious drawback, as it seriously reduces efficiency. For these and many other reasons, explosion gas turbines have not been nearly so practical as continuous combustion turbines. Therefore, it is the object of this invention to provide a simple, efficient, cheap, and practical explosive combustion system for gas turbines and the like.

FIGURE 1 is a schematic side view of the invention during intake.

FIGURE 2 is a side section of a closed reed valve.

FIGURE 3 is a side section of a reed valve at rest.

FIGURE 4 is a side section of a reed valve wide open.

FIGURE 5 is a graph of pressure versus time in the combustion chamber.

FIGURE 6 is a schematic side view of the invention during compression.

FIGURE 7 is a schematic side view of the invention during power-exhaust.

FIGURE 8 is a schematic side view of the invention shown with a carburetor and turbine.

FIGURE 9 is a schematic side view of the invention with various modifications added.

FIGURE 10 shows the cross-sectional size of the combustion chamber.

FIGURE 11 shows the cross-sectional size of the exhaust tube in relation to the cross-sectional size of the combustion chamber as shown in FIGURE 10.

Referring to FIGURE 1, and assuming the system is already in operation, open reed valves 1 admit air, indicated by arrows 2, into the combustion chamber 3. A detail of an open reed valve is shown in FIGURE 4. The reason the air is drawn into the combustion chamber 3 is that the exhaust gas, indicated by arrows 4, in the exhaust tube 5 is traveling away from the combustion chamber 3, and thereby creating a slight vacuum in the combustion chamber 3. Thus the momentum of the exhaust gas causes air to be admitted to the combustion chamber 3. The atmosphere can be considered as a supply of air in this case. As indicated, the air travels down the exhaust tube 5 as far as the dotted line 6. The burnt exhaust gases in the hot accumulator 8 are under a pressure higher than atmospheric, because the only way out to the atmosphere is through the nozzle 9, through which exhaust gas is shown escaping 10. Because of the pressure in the hot accumulator 8, the air is brought to a halt at dotted line 6 and forced backward towards the combustion chamber 3, as shown in FIGURE 6. When the air tries to escape back to the atmosphere through reed valves 1, they snap shut, as shown in FIGURE 2 in detail.

As the exhaust gas forces the air back down the exhaust tube 5 toward the combustion chamber 3, as shown in FIGURE 6, a fuel injector 11 squirts a spray 12 of liquid or gaseous fuel into the passing stream of air, charging it with fuel. When the exhaust gases force the air, now with a mixture of fuel, back to dotted line 13, the compression is brought to a halt, because the fuel and air mixture will be compressed to a higher pressure than that of the hot accumulator 8, and all the velocity energy in the exhaust tube 5 will be used up. Slightly before the compression is finished, a spark plug 14 makes a spark 15 which ignites the fuel-air mixture. At least a considerable portion of the fuel-air mixture quickly burns, or explodes, at high pressure, before it can escape down the exhaust tube 5. The reason for this is that the exhaust tube 5 is of a smaller cross-sectional area than the combustion chamber 3 (as can be seen indicated in FIGURES 6, 10, and 11) so that rate of egress, especially the initial rate, is limited. This quick burning at high pressure is followed immediately by a rush of burnt gas out the exhaust tube 5, as indicated by arrow 16 in FIGURE 7. This rush is caused by the fact that the pressure in the combustion chamber 3 in FIGURE 6 was higher than that of the accumulator 8. Also, the act of burning can raise the pressure even higher, if it is accomplished quickly enough. One way of speeding up the burning is to operate the invention so that exhaust gases force their way into the combustion chamber 3, say to a position 17. In this way, the exhaust gases themselves will ignite the fuel-air mixture, and the spark plug 14 could be turned off. This can be considered as a form of auto-ignition.

The rush of the burnt gas out of the exhaust tube 5 moves the interface between the charge of fresh air and the previously burned gas, indicated by dotted lines 6, 13, and 17 in FIGURES 1 and 6, out to a position 18 in FIGURE 7 in the hot accumulator 8. Of course, the interface is no longer distinguishable, because the fresh charge of air we were first considering is now burnt also. The hot accumulator 8, being of relatively large volume, due to its larger cross section than the exhaust tube 5, as indicated in FIGURE 6, absorbs the rush of gas from the exhaust tube 5, with the pulsating effect being minimized. Also, the pressure drop is minimized when the gas runs the other way in the exhaust tube. This is also due to the relatively large volume of the hot accumulator 8. The ability of the hot accumulator to minimize pulsations is even more pronounced when two or more combustion chambers, exhaust tubes, etc., are operating out of phase, and are connected to a single hot accumulator. It should be understood that the hot accumulator increases the intensity of the pulsations (or resonance) in the exhaust tube and combustion chamber, and that the minimization referred to is only in reference to the effect on following or dependent machines, such as jet nozzles, turbines, etc. As the burnt gases continue to rush down the exhaust tube 5, the pressure in the combustion chamber 3 drops below atmospheric. At this time the reed valves 1 open to admit air, and the cycle repeats. It should be noted that the reed valves time themselves to only open when the pressure in the combustion chamber is lower than atmospheric. Any valve could be used in place of the reed valves, as long as it was timed to open and close at the proper time.

Referring to FIGURES 2, 3, and 4, the reed 19, preferably made of spring stainless steel, or the like, in a reed valve 1 is seen to vibrate between positions shown in FIGURES 2 and 4. FIGURE 3 is the at rest or normal position. The natural frequency of the reed 19 should be somewhat higher than the frequency of the explosions to make up for the time period when the reed 19 is held shut by pressure.

Reed valves were selected because they are so quick acting, and because they naturally time themselves properly in the present invention. Poppet cam following valves, properly timed, should be given consideration, though, for large land based installation, because of their ruggedness. There are also other kinds of clack valves beside the reed valves that deserve consideration. The claims use the term valve, but it should be understood that this refers to a single valve or to several acting in unison. The claims also use the term one way air intake valve; this should be understood to mean a self-actuating valve that will allow air into the combustion chamber but not out. A reed valve is a specific example of this.

It is the intention that the valve(s) opening into the combustion chamber 3, to admit a new charge of air, should open when the pressure drops below that of the supply or atmosphere. Reed valves, due to their springiness, would tend to start to open an instant before this time. Also, they might not close exactly at the proper instant; however, cam timed valves would probably be even more unsatisfactory from this standpoint under varying operating conditions. Therefore, the claims should be read with the understanding that perfect timing is not meant, nor is it absolutely necessary.

Referring to FIGURE 7, it should be noted that both ends of the exhaust tube 5 are horn shaped 20, meaning that their cross-sectional area gradually increases towards the ends. This is very important for securing a transfer of energy from a velocity form to a pressure form with a minimum of loss. For land based installations, I would suggest that the shape of the horns be even more gradual than shown in FIGURES 1, 6, 7, 8, and 9, because gas is very prone to high turbulence loss when slowing down abruptly. The central portion of the exhaust tube 5 should be as straight as circumstances will permit. If it is necessary to conserve space, the exhaust tube 5 could be curved, but care should be taken that no abrupt curves of angles are allowed, because they would cause losses. The central portion of the exhaust tube 5 should also have as constant a cross section as possible to reduce losses. The ratio between the size of the combustion chamber 3 and the diameter of the exhaust tube 5 should be chosen large enough so that the burning is reasonably accomplished before too much of the charge escapes, and small enough so that the burnt gases are not overly detained, thereby seriously reducing the power output. The ratio between the volume of the exhaust tube 5 and the volume of the combustion chamber 3 should be chosen large (i.e., long exhaust tube 5) if the compression ratio should be large; on the other hand, the larger the ratio the more weight, heat loss, and gas friction. The same type of problem holds true for the hot accumulator 8; a large size reduces pulsations in the output, but increases heat loss, weight, etc. Suffice to say that all the factors should be carefully weighed for each application of the invention.

FIGURE 5 gives a graphic representation of how the invention works. Assume that the reed valves 1 were locked closed by some method (not shown), and also that nozzle 9 were blocked, and that the pressure in the enclosure were about 30 lbs./sq. in.; then if the gas in the exhaust tube 5 were set into oscillation, the pressure in the combustion chamber 3 would show a variation approximately as shown by line 21, if there were no viscosity losses. Thus, at the start of the graph, 0°, the pressure in the combustion chamber 3 is at a minimum, 5 lbs./sq. in.; at 180° (degrees represent time in the cycle) the pressure is a maximum, 50 lbs./sq. in., and so on. With this as a background, it is easier to understand the actual cycle. The pressure in the combustion chamber 3 cannot fall much below atmospheric, because the reed valves 1 open. This is shown by the fact that the line 22 representing the actual cycle only drops slightly below atmospheric (15 lbs./sq. in.) at locations 23. Then there is a pressure rise corresponding to the compression indicated in FIGURE 6. This is indicated by the rise in pressure 24. It is during this time that fuel is injected, as shown in FIGURE 6. At point 25 the spark 15 ignites the fuel-air mixture, and the pressure quickly rises to 150 lbs./sq. in. 27. Then, as the burnt gas rushes out of the exhaust tube 5, the pressure quickly falls 28. The cycle repeats over and over, as indicated. The pressure in the hot accumulator 8 should be in the neighborhood of 50 lbs./sq. in.

It should be clear that the invention operates and generates pressure because of the resonating gases inside.

The timing of the spark and fuel injection can be accomplished in many ways. Perhaps the simplest would be to have the injection and spark occur at a constant frequency, and have the injection occur the proper time before the spark. A better way is illustrated in FIGURE 7. A pressure sensor 29 senses the changes in pressure, and an electronic timing device 30 connected to the pressure sensor 29 triggers the injection and spark at the proper time. The spark plug 14 and the fuel injector 11 can both be activated by electricity. The fuel line 32 to the fuel injector 11 goes to an outside source of fuel under pressure, not shown. Since the present invention is not concerned primarily with the construction of such items as fuel injectors, spark plugs, pressure sensors, and timing devices, etc., these items are indicated schematically. The invention can be started by blowing a stream of air through the reed valves and initiating the fuel injection and spark. This is not shown, as it has previously been invented. The bare invention as shown in FIGURE 1 could be used for jet propulsion.

FIGURE 8 shows a turbine 33 (indicated schematically, to perform some useful work which is not shown) attached to the outlet 34 of the hot accumulator 8 of a modification of the present invention. It should be noted that no separate compressor is needed, because compression is accomplished right in the combustion chamber by virtue of the natural resonance and explosion.

FIGURE 8 also shows a carburetor type arrangement wherein a pipe 35 continuously squirts a finely divided stream of fuel 36 into the air entering the device through the carburetor tube 37. Although technically the fuel is added to the air before the air enters the combustion chamber 3, it should be understood with reference to the claims that this is also an effective means for charging the air in the combustion chamber with fuel. This type of fuel-air mixing is the simplest, cheapest, and most foolproof; however, it would probably not yield quite so high a pressure, due to the fact that some of the fuel might start to burn when it first came into the combustion chamber, or at least before the compression was fairly complete. To counteract this tendency, a fuel should be chosen whose ignition temperature is adequately high; if this is done, ignition might be substantially delayed until the compression was well along.

FIGURE 9 shows the invention together with an initial compressor 39 driven by a shaft (not shown). The initial compressor 39 has a low pressure tap 41 which discharges into a cool accumulator 42, which is a supply of air under pressure for the combustion chamber 3. The cycle is as described before (except that the reed valves open when the pressure in the combustion chamber drops below that of the cool accumulator 42) with the products of combustion emptying into the hot accumulator 8. However, in this modification, the hot accumulator 8 also receives air from a high pressure tap 43 of the initial compressor 36; this additional air is heated in transit by a regenerator 44, which heats with the exhaust gas from the turbine. This additional air is mixed in the accumulator to cool the products of combustion so that the turbine 33 would not become too hot. The pressure at the low pressure tap 41 plus the gain from the combustion in the combustion chamber 3 should approximately equal the pressure at the high pressure tap 43. Generally speaking, the turbine shaft (not shown) would be interconnected in some conventional way with the compressor shaft, and the excess power used in some useful manner.

Although FIGURE 9 shows the compressor 39 supplying the combustion chamber 3, this is not absolutely necessary because the combustion chamber is able to draw its own air in. Thus the compressor 39 could just be used to supply air to the hot accumulator 8, as shown. Or, alternately, the compressor 39 could be used to only supply air to the cool accumulator; in this case the regenerator 44 would be eliminated. Arrows 46 show the circulation in FIGURE 9.

Of course, one hot or cold accumulator could serve several combustion chambers and their exhaust tubes and other associated components. If several combustion chambers were associated with a single hot or cold accumulator, it would be advantageous to have the combustion chambers explode in time spaced sequence to further reduce the pulsations on the turbine or compressor.

It should be understood that the description of the cycle and the graphs in FIGURE 5 are only approximate for the purpose of a qualitative understanding.

I claim:

1. A resonant pressure generating combustion machine including in combination: a combustion chamber, means for charging the air in the combustion chamber with fuel, means for igniting the fuel-air mixture in the combuston chamber, an air intake valve opening into the combustion chamber, means to open the air intake valve when air would naturally flow into the combustion chamber due to reduced pressure inside the combustion, means to close the air intake valve when air would have a natural tendency to flow out of the combustion chamber due to increased pressure inside the combustion chamber, an exhaust tube of smaller cross section than the combustion chamber, a hot accumulator of larger cross section than the exhaust tube, the exhaust tube to form a connecting passageway between the combustion chamber and the hot accumulator, said hot accumulator comprising means to provide reversed exhaust gas flow to resonantly compress said fuel-air mixture in said combustion chamber.

2. A resonant pressure generating combustion machine as described in claim 1 with the additional qualification that each end of the exhaust tube should be horn shaped.

3. A resonant pressure generating combustion machine including in combination: a combustion chamber for the burning of a fuel-air mixture, means for charging the air in the combustion chamber with fuel, means for igniting the fuel-air mixture, a one way air intake valve on the combustion chamber, a hot accumulator, an exhaust tube connecting the combustion chamber and the hot accumulator, said hot accumulator comprising means to provide reversed exhaust gas flow to resonantly compress said fuel-air mixture in said combustion chamber.

4. A resonant pressure generating combustion machine as described in claim 3 with the additional qualification that the exhaust tube is horn shaped on both ends.

5. A resonant pressure generating combustion machine as described in claim 3 with the additional qualification that the exhaust tube is horn shaped on both ends and that the one way air intake valve should be a reed valve.

6. A resonant pressure generating combustion machine including in combination: a combustion chamber, means for charging the air in the combustion chamber with fuel, means for igniting the fuel-air mixture in the combustion chamber, an air intake valve on the combustion chamber, means to cause the air intake valve to open when the pressure in the combustion chamber drops below the pressure of the air supply and to close when the pressure in the combustion chamber rises above the pressure of the air supply, an exhaust tube, one end of which is connected to the combustion chamber, the other end of the exhaust tube to be connected to the hot accumulator, the exhaust tube to have a smaller cross section than the combustion chamber, a hot accumulator of greater cross section than the exhaust tube, said hot accumulator comprising means to provide reversed exhaust gas flow to resonantly compress said fuel-air mixture in said combustion chamber.

References Cited by the Examiner

UNITED STATES PATENTS

| | | | |
|---|---|---|---|
| 2,546,966 | 4/1951 | Bodine | 60—39.77 X |
| 2,581,669 | 1/1952 | Kadenacy | 60—39.77 |
| 2,674,091 | 4/1954 | Malick | 60—39.77 |
| 3,060,682 | 10/1962 | Kemenczky | 60—39.77 X |

MARK NEWMAN, *Primary Examiner.*

RALPH D. BLAKESLEE, *Examiner.*